Patented Aug. 14, 1945

2,382,394

UNITED STATES PATENT OFFICE 2,382,394

TREATMENT OF HYDROCARBONS

John George Mackay Bremner, Peter William Reynolds, and Arthur William Charles Taylor, Norton-on-Tees, England, assignors to Imperial Chemical Industries Limited, a corporation of Great Britain No Drawing. Application June 18, 1941, Serial No. 398,680. In Great Britain June 21, 1940

4 Claims. (Cl. 260—683.3)

This invention relates to catalysts suitable for use in dehydrogenation reactions and especially in the dehydrogenation of hydrocarbons to olefines and diolefines containing the same number of carbon atoms.

Catalysts essentially consisting of or containing substantial amounts of oxides of aluminium and chromium are known to be suitable for the dehydrogenation of hydrocarbons. The methods disclosed for the preparation of these catalysts include, for example, that of impregnating activated alumina, e. g., in the form of porous calcined granules, with a chromic acid solution.

These known catalysts when used for example in the dehydrogenation of paraffin hydrocarbons to the corresponding olefines, deteriorate in activity and have carbonaceous material deposited on them during the dehydrogenation, but they can be regenerated by interrupting the dehydrogenation process and passing an oxygen-containing gas over them at an elevated temperature.

In practice, therefore, the dehydrogenation is carried out in a series of cycles of alternating periods of dehydrogenation and regeneration. The decrease in activity which occurs from the moment when dehydrogenation is commenced to the moment when it is interrupted and regeneration started, is hereinafter termed "intracyclic deterioration."

We have found that when these known catalysts are used for many cycles of dehydrogenation and regeneration, a decrease in the mean activity in each dehydrogenation period gradually becomes evident. The regeneration process, therefore, does not fully restore the activity of these known catalysts. The degree of restoration obtained by the regeneration process decreases with increase in temperature of the dehydrogenation and the regeneration.

We have now found a catalyst which for any given temperature of dehydrogenation and regeneration can be more completely regenerated than the known catalysts can be under the same conditions, and which moreover, when employed at temperatures of the order of 500° C. to 600° C. does not show any appreciable fall in mean activity per cycle, in two months of continuous subjection to alternate cycles of dehydrogenation and regeneration.

The catalyst of the present invention comprises aluminum chromite as its essential constituent, a product obtained by cautious thermal decomposition of a precipitate produced from an aqueous solution containing an aluminium salt, together with ammonium chromate, ammonium dichromate, or chromium trioxide by adding thereto ammonia, ammonium bicarbonate, or ammonium carbonate in an amount at least sufficient to give substantially complete precipitation of the aluminium.

Aluminium nitrate has been found to be a convenient aluminium salt for use in the preparation of the catalyst. Any soluble aluminium salt may, however, be used, e. g., aluminium chloride or its hydrated forms, or aluminium sulphate.

The ratio of aluminium salt to the ammonium dichromate, ammonium chromate, or chromium trioxide, may be varied within wide limits. It is preferred to use a ratio of aluminium salt to chromium compound such that the chromium content, reckoned as $Cr_2O_3$, of the said essential constituent on a water-free basis is between 40% and 50%, calculated on a weight basis.

Aluminium salts frequently contain iron which, unless it is poisoned by sulphur, increases the deposition of carbonaceous material on the catalyst when it is used for the dehydrogenation of organic compounds. When a solution of aluminium salt and ammonium dichromate is employed, it is therefore advantageous to allow the solution to stand for a few hours, when the bulk of any iron present settles out as ferric dichromate and can be separated from the solution, before the addition of ammonia or its carbonate salts is made to obtain substantially complete precipitation of the aluminium.

To obtain the removal of iron in a similar manner when a solution of the aluminium salt and chromium trioxide is employed, the chromium trioxide must first be converted to ammonium dichromate by adding the theoretical amount and preferably slightly more of ammonia or its carbonate salts.

This simple method for the removal of iron is not applicable when ammonium chromate is used, since in solution it reacts immediately with the aluminium salt to give a precipitate of aluminium hydroxide.

The substantially complete precipitation of the aluminium with ammonia or its carbonate salts may be carried out at any temperature from the freezing point to the boiling point of the solution. Ammonia may be used either as a gas or in aqueous solution, while ammonium bicarbonate and ammonium carbonate are most conveniently used as solutions in water. The amount of precipitating agent does not appear to be critical, but it is preferred to add just sufficient to obtain substantially complete precipitation. The precipitate, after separation from the mother liquor, should not be subjected to any extensive washing and in general it is desirable that the precipitate should not be washed at all.

The precipitate is conveniently dried at room temperature in air or in an oven at a temperature up to about 120° C. and then disintegrated before subjecting it to thermal decomposition.

The thermal decomposition of the precipitate is carried out by heating it slightly in order to start the reaction, and then continuing to heat carefully until the reaction is substantially complete. In view of the exothermal nature of the decomposition, care should be taken to avoid the development of high local temperatures, for example, by suitable disposition or agitation of the precipitate. It appears that the decomposition should take place at as low a temperature as possible for the best results. The decomposition is conveniently carried out in air, but other atmospheres, such as steam, nitrogen or hydrogen, may be used.

We have further found that intracyclic deterioration of the catalyst and carbonaceous deposition can be decreased by the presence in the catalyst of a compound of the alkali metals or the chromite, chromate, or dichromate of zinc.

The chromates of the alkali metals have been found to be better than other alkali metal compounds, and the compounds of zinc hereinbefore mentioned. Potassium compounds in general appear to give better results than the corresponding compounds of the other alkali metals and potassium chromate is outstandingly better than all other compounds tested.

In the early stages of the life of a catalyst containing potassium chromate, carbon deposition is very small and intracyclic deterioration is almost absent. On prolonged subjection to alternate cycles of dehydrogenation and regeneration, carbon deposition increases to a limiting value, and intracyclic deterioration appears, but both are lower than for a catalyst containing no potassium chromate.

In general the alkali metal compounds should be present in an amount by weight between 0.05% and 5.0% of the product obtained by the thermal decomposition hereinbefore described. The corresponding percentages in the case of the zinc compounds in general lie between 0.05% and 10.0%

The alkali metal and zinc compounds may be introduced into the catalyst in any suitable manner, e g., by addition as such or by production in situ, and at any convenient stage in or after the manufacture of the essential constituent of the catalyst. We prefer, however, to mix the alkali metal and zinc compounds with the previously prepared essential constituent, make the mixture into a slurry with water, and finally dry it.

The catalysts of this invention may have incorporated in them other compounds such as the oxides of magnesium, aluminium, and zinc, and may be used supported on suitable carriers or in the form of granules or as pellets.

The activity of the catalysts of this invention is influenced by the amount of water vapour present in the material to be hydrogenated. For any given raw material, the amounts of water which are suitable can easily be determined by a few simple experiments.

As examples of dehydrogenation processes for which our catalysts are useful, there may be cited the dehydrogenation of hydrocarbons such as the conversion of paraffin hydrocarbons to olefines containing the same number of carbon atoms, and the production of diolefines from olefines.

In order to illustrate the action of the catalysts of this invention, the following examples are given of their use in the dehydrogenation of paraffin hydrocarbons.

*Example 1*

A catalyst was prepared by adding a solution of 1 part by weight of ammonium dichromate in 4.5 parts by weight of water to a solution of 2 parts by weight of aluminium nitrate $$(Al(NO_3)_3.9H_2O)$$

in 2.6 parts by weight of water. The mixed solutions were heated to 80° C. and precipitated by the addition of 1.1 parts by weight of aqueous ammonia containing 25% by weight of $NH_3$, the mixture being thoroughly stirred throughout and for 10 minutes after the addition. After cooling to room temperature, the precipitate was filtered, pressed and dried at 110° C.

The dried precipitate was powdered and cautiously decomposed by heating it in small portions in a porcelain dish over a low flame, the powder being vigorously stirred to prevent excessive heating by bursts of spontaneous decomposition. The highly exothermic decomposition began at about 120° C. and was substantially completed by raising the temperature of the powder to 350° C. The material was finally heated in dry air to 500° C., maintained at this temperature for 1 hour, and cooled.

The powdered catalyst prepared in the manner described, was mixed with 4% by weight of aluminium stearate and pelleted to ⅛" x ⅛" cylinders. These were finally calcined in air up to 500° C. to remove the organic material of the pelleting lubricant.

15 ccs. of this pelleted catalyst were charged to a silica reaction tube filled on each side of the catalyst with silica chips, and heated in a suitable furnace to 540° C. A mixture of 80% isobutane and 20% n-butane was dried over fused calcium chloride and admitted to the catalyst at a space velocity of 2000 litres (measured at 20° C. and 1 atmosphere) per litre of catalyst space per hour. The run was continued for ½ hour, and a mean sample of the exit gas collected. At the end of this time the system was purged for 2½ minutes with nitrogen at a rate of 5000 litres (measured at 20° C. and 1 atmosphere) of nitrogen per litre of catalyst space per hour, regenerated with calcium chloride-dried air for 25 minutes at reaction temperature and the same space velocity as with nitrogen, purged again with nitrogen, and the cycle of operation recommenced. This cycle of operation was continued for 2 months, the reaction temperature being increased from 540° C. to 580° C. and brought back again to 540° C. at the conclusion of the run.

The results obtained are shown in the following table, from which it is apparent that the activity of the catalyst had not diminished appreciably after 2 months processing. At the end of the run the catalyst was removed from the apparatus and was found to be scarcely inferior in pellet strength to the fresh material. The butylene yield throughout the run (during which the unconverted butane was recycled several times through the conversion stage) was greater than 95%.

| Number of cycles | Catalyst temperature in ° C. | Average per cent butylene in mean ½ hour exit gas sample |
|---|---|---|
| 1st–50th | 540 | 16.0 |
| 100th–150th | 550 | 17.7 |
| 150th–200th | 550 | 17.6 |
| 200th–250th | 555 | 18.1 |
| 250th–300th | 560 | 19.9 |
| 300th–350th | 560 | 19.3 |
| 400th–450th | 570 | 20.0 |
| 450th–500th | 570 | 20.9 |
| 500th–550th | 570 | 20.5 |
| 550th–600th | 570 | 19.5 |
| 650th–700th | 580 | 21.6 |
| 700th–750th | 580 | 21.3 |
| 800th–850th | 575 | 22.2 |
| 850th–900th | 575 | 21.5 |
| 900th–950th | 575 | 21.8 |
| 950th–1,000th | 575 | 20.8 |
| 1,000th–1,050th | 575 | 21.9 |
| 1,050th–1,120th | 570 | 21.7 |
| 1,120th–1,200th | 570 | 20.8 |
| 1,200th–1,270th | 570 | 20.7 |
| 1,270th–1,360th | 570 | 20.1 |
| 1,360th–1,400th | 540 | 15.7 |

*Example 2*

A powdered catalyst was prepared as described in Example 1 and the powder mixed to a paste with 2½% of its weight of potassium chromate dissolved in water. The paste was dried and pelleted with the addition of 4% of aluminium stearate as a binder.

Substantially pure propane, dried over calcium chloride, was passed at the rate of 2000 volumes of propane (measured at 20° C. and 1 atmosphere) per unit volume of catalyst space per hour, over the catalyst maintained at a temperature of 620° C. and samples of the exit gas were taken over hourly periods. During the hour following the first 15 minutes of the run the average olefine and hydrogen contents of the exit gas were respectively 17.5% and 18.0%. During the hour following the first 1½ hours of the run the average olefine and hydrogen contents of the exit gas were respectively 16.7% and 17.0%. During the hour following the first 4½ hours of the run the average olefine and hydrogen contents of the exit gas were respectively 12.9% and 13.5%.

In a comparative experiment a catalyst prepared exactly as above but without the addition of potassium chromate was charged in the form of pellets into the reaction vessel, and substantially pure propane, dried over calcium chloride, was passed over it at the rate of 2000 volumes of propane per unit volume of catalyst space per hour, the temperature of the catalyst being 620° C. During the hour following the first 15 minutes of the run the average olefine and hydrogen contents of the exit gas were respectively 17.9% and 17.5%. During the hour following the first 1½ hours of the run the average olefine and hydrogen contents of the exit gas were respectively 12.2% and 11.6%. The marked effect of potassium chromate in suppressing intracyclic deterioration of the catalyst of the invention is apparent from these results.

*Example 3*

A catalyst was prepared by adding to a catalyst powder obtained as described in Example 1, an equal weight of powdered magnesia, mixing the constituents thoroughly by light grinding and finally pelleting with the addition of 4% by weight of aluminium stearate.

Substantially pure propane, dried by passage over fused calcium chloride, was passed over this catalyst at the rate of 2000 volumes of propane (measured at 20° C. and 1 atmosphere pressure) per volume of catalyst space per hour, the temperature being maintained at 620° C. An average sample of the exit gas taken over the first 1¼ hours of the run contained 15.3% hydrogen and 14.5% olefines, of which more than 90% was propylene.

*Example 4*

A powdered catalyst was prepared as described in Example 1. A portion of this powdered material was made into cylindrical pellets ⅛" long, ⅛" diameter, after the addition of 4% of aluminium stearate to act as a lubricant and binding agent. Another portion of this powdered material was mixed with 1% by weight of potassium chromate in the presence of a little water, dried at 110° C. and made into cylindrical pellets, ⅛" long, ⅛" diameter, after the addition of 4% of aluminium stearate to act as a lubricant and binding agent. The two products were calcined in air at 500° C. to remove the organic material of the pelleting agent.

10 ccs. each of these catalysts were filled into silica reaction tubes in a furnace block at 620° C. and propane dried over calcium chloride admitted to the tubes at a space velocity of 2000 litres (measured at 20° C. and 1 atmosphere) per litre of catalyst space per hour. Samples for analysis were taken from the exit gases over a period of 2 hours, at the end of which the catalyst was regenerated by heating for 1 hour in air. The carbon removed from the catalyst during regeneration was determined.

Several cycles of dehydrogenation and catalyst regeneration were carried out and the following results were obtained.

| Cycle No. | Mean per cent conversion of propane during 2-hour dehydrogenation period | | Carbon removed in regeneration. Weight of carbon/cubic meter propylene formed | |
|---|---|---|---|---|
| | Catalyst without potassium chromate | Catalyst with 1% potassium chromate | Catalyst without potassium chromate | Catalyst with 1% potassium chromate |
| 6 | 17.0 | 22.9 | 50 | 25 |
| 12 | 17.3 | 23.0 | 48 | 24 |
| 26 | 18.7 | 22.3 | 46 | 23 |
| 48 | 17.3 | 22.3 | 45 | 22 |

*Example 5*

A powdered catalyst was prepared as described in Example 1. Four samples from one batch of this material were taken. The first was mixed with 4% by weight of aluminium stearate and pelleted. The remaining samples were mixed with 1%, 2%, and 5% by weight respectively of zinc chromate, slurried with a little water, dried at 100° C. admixed with 4% by weight of aluminium stearate and pelleted. The four catalysts were tested together in the dehydrogenation of propane which had been dried over calcium chloride. The dehydrogenation was carried out at 620° C. and a space velocity of 2000 litres of propane (measured at 20° C. and 1 atmosphere) per litre of catalyst space per hour. After 50 hours processing on propane with intermittent air regeneration at reaction temperature, the olefine content of the exit gas collected over a half-hour dehydrogenation period and the corresponding carbon deposition in the catalysts were as follows:

|  | Per cent olefines | Gms. carbon deposited/cubic meter propylene formed |
|---|---|---|
| Catalyst without zinc chromate | 17.0 | 70 |
| Catalyst with 1% zinc chromate | 17.2 | 50 |
| Catalyst with 2% zinc chromate | 17.8 | 25 |
| Catalyst with 5% zinc chromate | 17.9 | 27 |

We claim:

1. In a process for the catalytic dehydrogenation of normally gaseous paraffin hydrocarbons to the corresponding olefines, the use of a catalyst comprising at least one of the chromium compounds selected from the group consisting of potassium chromate, sodium chromate, zinc chromite, zinc chromate, zinc dichromate, together with a product obtained by cautious thermal decomposition of a precipitate produced from an aqueous solution containing an aluminium salt and a compound selected from the group consisting of ammonium dichromate, ammonium chromate, chromium trioxide, by adding thereto precipitant selected from the group consisting of ammonia, ammonium bicarbonate, ammonium carbonate, in an amount at least sufficient to give substantially complete precipitation of the aluminium, said chromium compound being present in an amount by weight between 0.05% and 5.0% of the said product.

2. In a process for the catalytic dehydrogenation of normally gaseous paraffin hydrocarbons, the use of a catalyst comprising at least one of the compounds selected from the group consisting of potassium chromate, sodium chromate, zinc chromite, zinc chromate, zinc dichromate, together with a product obtained by cautious thermal decomposition of a precipitate obtained from an aqueous solution containing an aluminum salt and a compound selected from the group consisting of ammonium dichromate, ammonium chromate, chromium trioxide, by adding thereto precipitant selected from the group consisting of ammonia, ammonium bicarbonate, ammonium carbonate, in an amount at least sufficient to give substantially complete precipitation of the aluminum.

3. In a process for the catalytic dehydrogenation of normally gaseous paraffin hydrocarbons, the use of a catalyst comprising at least one of the compounds selected from the group consisting of potassium chromate, sodium chromate, zinc chromite, zinc chromate, zinc dichromate, together with a product obtained by cautious thermal decomposition of a precipitate obtained from an aqueous solution containing an aluminum salt and a compound selected from the group consisting of ammonium dichromate, ammonium chromate, chromium trioxide, by adding thereto precipitant selected from the group consisting of ammonia, ammonium bicarbonate, ammonium carbonate, in an amount at least sufficient to give substantially complete precipitation of the aluminum, the chromium content of said product, on a water-free basis and calculated by weight as chromium sesquioxide, lying between 40% and 50%.

4. In a process for the catalytic dehydrogenation of hydrocarbons of at least three carbon atoms to the molecule, the use of a catalyst comprising at least one of the compounds selected from the group consisting of potassium chromate, sodium chromate, zinc chromite, zinc chromate and zinc dichromate, together with a product obtained by cautious thermal decomposition of a precipitate obtained from an aqueous solution containing an aluminum salt and a compound selected from the group consisting of ammonium dichromate, ammonium chromate and chromium trioxide, by adding thereto a precipitant selected from the group consisting of ammonia, ammonium bicarbonate and ammonium carbonate, in an amount at least sufficient to give substantially complete precipitation of the aluminum.

JOHN GEORGE MACKAY BREMNER.
PETER WILLIAM REYNOLDS.
ARTHUR WILLIAM CHARLES TAYLOR.